Patented Apr. 5, 1927.

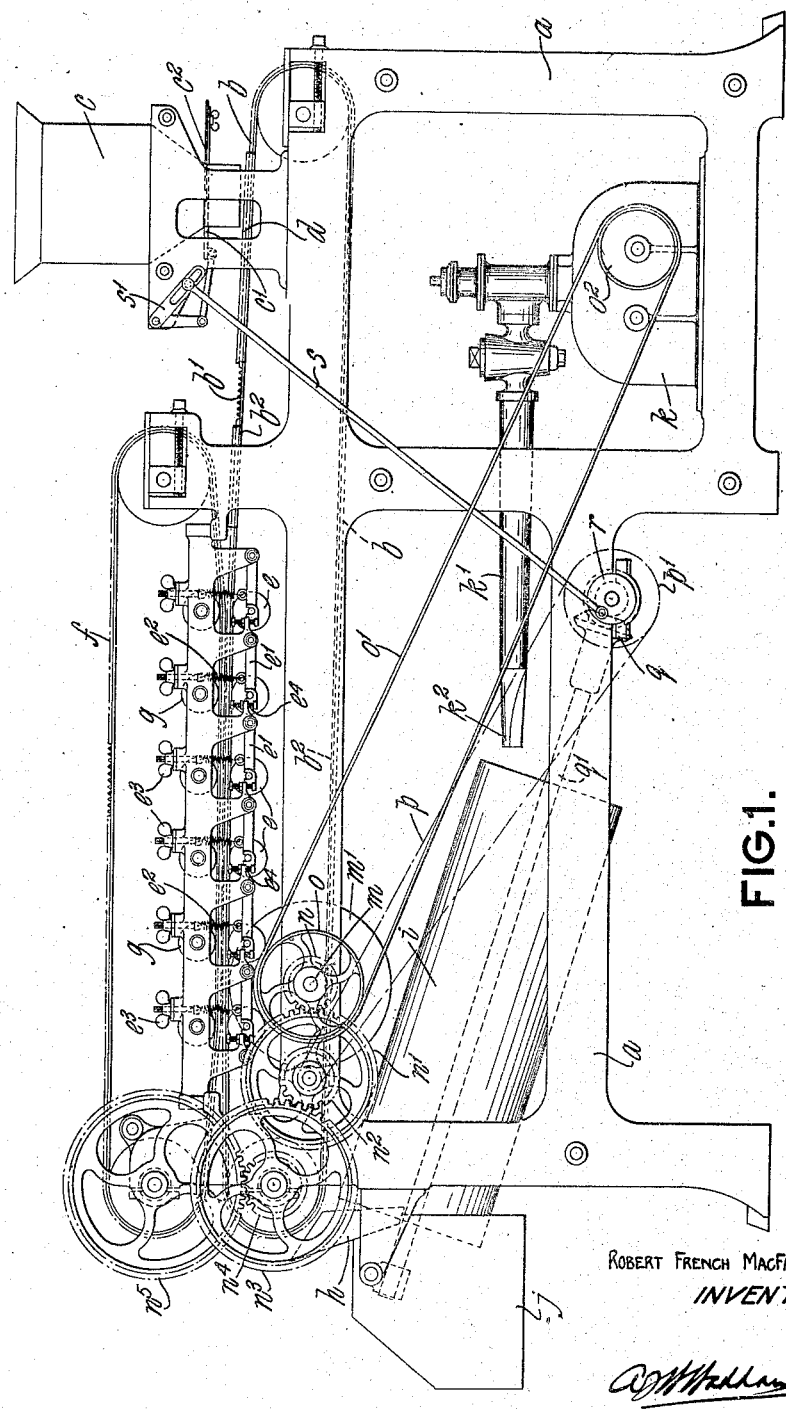

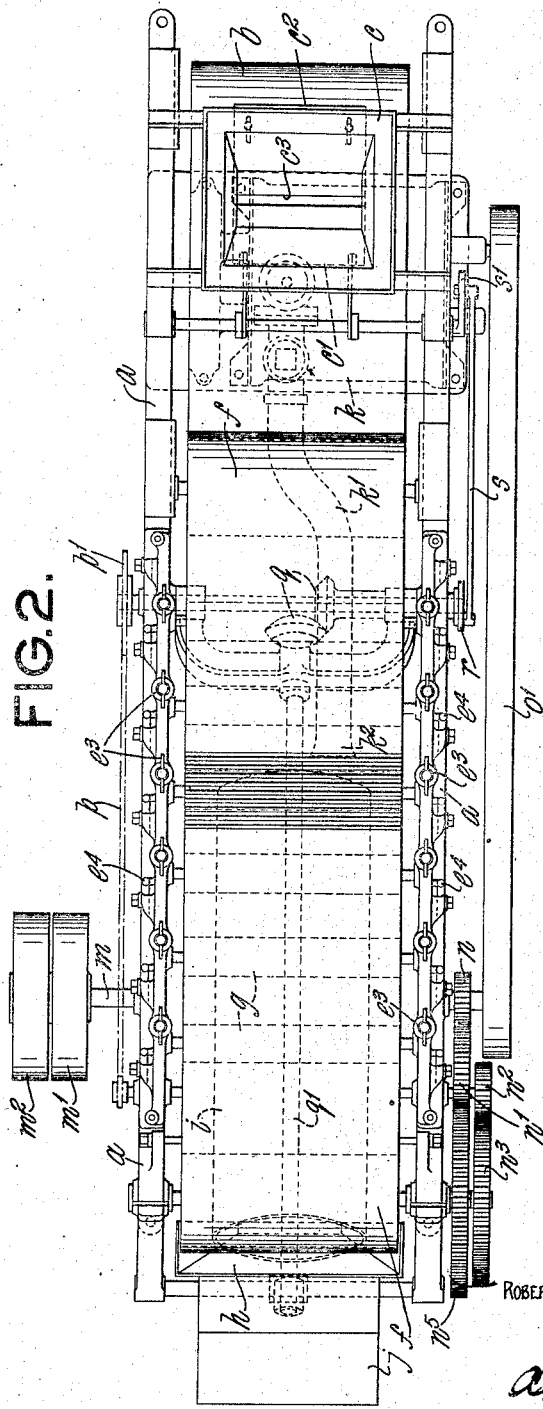

1,623,739

UNITED STATES PATENT OFFICE.

ROBERT FRENCH MACFARLANE, OF LONDON, ENGLAND.

MACHINE FOR HUSKING ALMONDS AND OTHER KERNELS OR THE LIKE.

Application filed April 8, 1925, Serial No. 21,460, and in Great Britain May 9, 1924.

This invention relates to a machine for "blanching" almonds and the like, that is to say, removing the husks or skins from the kernels which is usually effected by soaking the almonds in hot water or steaming them and then passing through abrading or pressure rollers.

According to this invention all rollers acting directly on the kernels are dispensed with and I provide a machine in which the kernels are subjected to a resilient but efficient abrasive action by which a very high percentage of the kernels passed through are effectively husked or skinned.

Broadly stated, the machine comprises a conveyor by which the kernels are carried along and simultaneously acted upon by a plane pressure member having a differential movement to the conveyor, whereby the kernels are subjected between said conveyor and pressure member to a resilient abrasive action resulting in the removal of the husks or skins.

The invention also comprises other details of construction, arrangement and combinations of parts, all set forth in appended claims and hereinafter fully described with reference to the accompanying drawings in which:—

Fig. 1 is a side elevation and Fig. 2 a plan view of a machine according to this invention.

The embodiment of the machine forming the subject of the present invention and illustrated in said drawings comprises a suitable framework $a$ supporting all the operative parts which include means for feeding the kernels to be treated to an endless conveyor $b$, these means comprising a hopper $c$ with inclined base and having a reciprocating base plate $c^1$ passing over a fixed plate $c^2$, said plates each having a transverse discharge slot $c^3$. The stroke of the plate and consequently the dimensions of the slot are adjustable according to the size of kernels under treatment. The kernels passing through said discharge slot $c^3$ are thus delivered onto the conveyor $b$ in a row or rows extending transversely of the conveyor.

The said conveyor is provided with a series of transverse ribs $b^1$ (certain of which only are shown for clearness) and may conveniently be formed of an endless web of ribbed rubber loosely mounted on a canvas band $b^2$ the said band taking the major part of the driving strain and thus relieving the rubber surface of undue tension. The conveyor may pass at its end through a trough shaped guide $d$ to ensure good tracking and over spring pressed rollers $e$ located at suitable intervals in its length in order that it may yield to some extent under pressure exerted by the kernels which pass along on said conveyor between the latter and another similarly constructed pressure web $f$ mounted above the conveyor. The conveyor $b$ and web $f$ are driven at different or differential speeds, for example, the web $f$ may be driven at a slower speed than the conveyor $b$.

The kernels, disposed between said conveyor and web, are thus treated to the required abrasive action, which however is further assisted or improved by the provision of the rollers $e$ and of a similar series of rollers $g$ positioned immediately above or to the rear of the adjacent active surface of the web $f$, all the rollers being of such character or so mounted as to exert resilient pressure on the surfaces of the conveyor and web to exert a "nip" or "grip" on the kernels between them. Thus said active surfaces of the conveyor and web may be given a slightly undulating contour which materially assists their rubbing action and consequently improves the action and output of the machine.

One or other or both series of rollers is preferably adjustable as by screw means and in addition be arranged under spring load so that if a large kernel passes between them they would react against the spring pressure and again return to normal when the kernel has passed. The spring pressure may be varied as desired in addition to the position of the rollers being adjustable.

A convenient method of mounting the rollers is as shown particularly in Fig. 1 viz. by carrying them in pivoted rocking arms $e^1$ under the action of springs $e^2$ tending to produce the required resilient pressure on the conveyor and to provide means such as thumb nuts $e^3$ for individually adjusting the pressure of said rollers in order that if required different degrees of pressure may be possible at various parts of the conveyor. The springs may be coupled to the rocking arms which carry the rollers as shown and said arms rise against a stationary abutment $e^4$ shown in the form of a screw which can be set to regulate the position of the roller when not deflected by an obstruction passing between the rollers. In practice it will probably be sufficient if the rollers pertaining to but one of the conveyors are made resilient or adjustable as shown, the rollers of the other conveyor being more or less of a rigid character or rigidly mounted. The methods described of mounting both the conveyor and pressure webs causes the almonds to be spread out on the conveyor, and a resilient abrasive action exerted on the kernels passing between them on the conveyor, resulting in a very complete husking of said kernels without damage thereto.

The means for adjusting the degree of pressure and distance between the conveyor $b$ and web $f$ provide for different sizes of kernels being dealt with and these means are however preferably so constructed as to prevent at all times direct contact between the conveyor and web.

The kernels and removed husks pass along together on the conveyor $b$ to the end thereof and drop off into a chute $h$ which guides them into an inclined open ended and rotatable cylinder $i$ positioned below; and through said cylinder a current of air is projected or passes by which the husks are blown away at the top into a suitable container $j$ and the husked or "blanched" kernels pass out through the lower end of the cylinder to a second container or other collecting device (not shown). The means for producing the current of air may comprise a blower in casing $k$ provided with a valved discharge pipe $k^1$ terminating in a nozzle $k^2$ terminating close to the lower end of the cylinder. These means are preferably formed as a unit with the machine as shown but may be separate therefrom according to existing conditions. The angle of the current of air in relation to the interior of the cylinder may be varied according to requirements and the class of kernels under treatment.

The moving parts of the machine are all suitably driven from one main shaft $m$ provided with fast and loose pulleys $m^1$, $m^2$. Thus the conveyor $b$ is driven from said shaft through gears $n$, $n^1$, $n^2$, $n^3$ and the web $f$ through gears $n$, $n^1$, $n^2$, $n^3$, $n^4$, $n^5$. The blower is driven from a pulley $o$ on shaft $m$ and through belt $o^1$ to pulley $o^2$ on shaft of blower in casing $k$. The cylinder $i$ is rotated through chain and sprocket gear $p$ $p^1$ driven from shaft of gear $n^2$ and driving through bevel gear $q$ a shaft $q^1$ extending through the cylinder. The said bevel gear $q$ drives a crank disc $r$ which through connecting rod $s$ and lever and link systems $s^1$ operates the slotted feed plate $c^1$ in the hopper $c$ the lever $s^1$ having slotted connection with the rod $s$ for adjusting the stroke of the plate.

What I claim as my invention and desire to secure by Letters Patent of the United States is:—

1. A machine for husking nut kernels comprising a plurality of parallelly extending abrasive members arranged in spaced relation and between which the kernels are adapted to pass under the influence of one of said members, means for driving said member, and means for subjecting one of said members to yielding pressure.

2. A machine for husking nut kernels comprising a plurality of parallelly extending abrasive members arranged in spaced relation, one of said members serving as a conveyor for the kernels being operated upon, means for driving said members in the same direction at different speeds, and means for subjecting one of said members to yielding pressure at spaced intervals in the length thereof.

3. A machine for husking nut kernels, comprising a frame, a pair of spaced parallelly extending abrading members between which the nut kernels to be treated are adapted to pass, a plurality of rigidly mounted rollers engaging one of said abrasive members, and a plurality of yieldingly mounted rollers engaging the other of said abrasive members and tending to move the same in the direction of the first mentioned abrasive member.

4. A machine for husking nut kernels comprising a pair of parallelly travelling abrading members, and a plurality of yieldingly mounted rollers arranged at spaced intervals in the length of one of said abrasive members, and exerting pressure thereon in the direction of the other abrading member.

5. A machine for husking nut kernels comprising two parallelly extending abrading members, a plurality of yieldingly mounted rollers engaging one of said members, and exerting pressure thereon in the direction of the other of said abrading members, and means for adjusting the tension of said yieldingly mounted rollers.

6. A machine for husking nut kernels, said machine comprising a frame, a plurality of parallelly extending abrading members mounted in said frame, means for driving said abrading members in the same direction at different speeds, means for feeding the nut kernels to be operated upon to said abrading members, and means for exerting yielding pressure to one of said abrading members at spaced intervals in the length thereof, said pressure exerting means being adjustable.

7. A machine for husking nut kernels comprising a frame, a plurality of parallelly extending abrading members mounted in said frame, means for driving said abrading members in the same direction at different speeds, means for feeding the nut kernels to be operated upon between said abrading members, and means for subjecting one of said abrading members to yielding pressure at spaced intervals in the length thereof, said means comprising a plurality of rollers movable bodily toward and away from said abrasive member, and capable of adjustment in such a manner that one end of a roller may be positioned in closer proximity to the abrading member than the opposite end of the roller.

In witness whereof I have signed this specification.

ROBERT FRENCH MACFARLANE.